United States Patent
Richards

(10) Patent No.: US 8,419,351 B2
(45) Date of Patent: Apr. 16, 2013

(54) ROTATION ARRANGEMENT

(75) Inventor: Martyn Richards, Staffordshire (GB)

(73) Assignee: Rolls-Royce PLC (GB)

( * ) Notice: Subject to any disclaimer, the term of this patent is extended or adjusted under 35 U.S.C. 154(b) by 657 days.

(21) Appl. No.: 12/647,896

(22) Filed: Dec. 28, 2009

(65) Prior Publication Data

US 2010/0189548 A1 Jul. 29, 2010

(30) Foreign Application Priority Data

Jan. 23, 2009 (GB) .................. 0901059.6

(51) Int. Cl.
*F01D 15/12* (2006.01)
(52) U.S. Cl.
USPC ........ 415/118; 415/122.1; 415/123; 415/124; 415/201; 415/231
(58) Field of Classification Search .......... 415/118, 415/122.1, 123, 124, 201, 230, 231
See application file for complete search history.

(56) References Cited

U.S. PATENT DOCUMENTS

| 3,021,719 | A |   | 2/1962 | Conrad, Jr. |
| 3,960,028 | A | * | 6/1976 | Martin ........................ 74/405 |
| 4,446,728 | A | * | 5/1984 | Ito ............................ 73/112.01 |
| 4,960,006 | A |   | 10/1990 | Moore |
| 5,813,829 | A |   | 9/1998 | Mazzotta |

FOREIGN PATENT DOCUMENTS

| DE | 3150797 A1 | 6/1983 |
| EP | 1795713 A1 | 6/2007 |
| GB | 1487515 | 10/1977 |

* cited by examiner

*Primary Examiner* — Igor Kershteyn
(74) *Attorney, Agent, or Firm* — McCormick, Paulding & Huber LLP

(57) ABSTRACT

A selective rotation arrangement for a shaft, the arrangement including a housing mountable spaced from the shaft and an engagement member with distal and proximal ends which is selectively movable relative to the housing towards or away from the shaft between an operating position towards the shaft and a rest position clear of the shaft, the engagement member having a gear member at the distal end thereof which is engageable with the shaft in the operating position to permit turning of the shaft by the engagement member, but is disengaged from the shaft in the rest position.

15 Claims, 3 Drawing Sheets

ROTATION ARRANGEMENT

CROSS REFERENCE TO RELATED APPLICATION

This application is entitled to the benefit of British Patent Application No. GB 0901059.6, filed on Jan. 23, 2009.

FIELD OF THE INVENTION

This invention concerns a selective rotation arrangement for a shaft, a selective rotation arrangement for a shaft on a gas turbine engine, and a gas turbine engine including a selective rotation arrangement for a shaft.

BACKGROUND OF THE INVENTION

Conventionally, gas turbine aircraft engines have the external power taken through a geared external drive from the high pressure rotor system. FIG. 1 diagrammatically shows such a gas turbine engine 10 with three drive shafts 12, 14, 16. The shaft 12 will be connected to the fan (not shown), whilst the shaft 14 is connected to the intermediate pressure compressor with a rotor 18. The shaft 16 is connected to the rotor 20 of the high pressure compressor. The intermediate casing and internal gearbox 22 is located between the rotors 18, 20. Downstream of the compressors are the combustor 24, high pressure turbine 26, intermediate pressure turbine 28, and low pressure turbine 30.

Having an external drive attached to the high pressure compressor system has a secondary function, enabling hand or ground cranking of the high pressure rotor 20 to enable inspection thereof through boroscope access ports in the casing.

The demand for electric power within aircraft is increasing and this makes it beneficial for power to be extracted from the intermediate power compressor system. With the intermediate power compressor, more power is available at low speed without compromising compressor stability. In view of this, proposals have been made to use a concentric high power/intermediate power external drive. With this system a switchable clutch type coupling has been provided to connect the intermediate pressure and high pressure spools for starter assist.

A feature of this arrangement is that the high power drive is permanently connected to the high power rotor, thereby providing a means for enabling rotation of the high pressure rotor for inspection. With this arrangement though, the high pressure gear is only required for starting but is permanently connected to the high pressure rotor, and therefore spins under normal running which is a source of windage loss and reduced reliability.

It may therefore be desirable just to provide a drive off the intermediate pressure shaft, but there is then the problem of enabling turning of the high pressure rotor to enable inspection.

Proposals have been made to enable a tool to engage with the high pressure spool gear by being inserted into the internal gearbox. It is however undesirable to break into a clean oil chamber with an external tool that could allow ingress of damaging dirt or grit. Other proposals have also been made, including for instance inserting a geared tool into the bearing chamber, but again there is the possibility of the ingress of dirt into the chamber. It is also necessary to provide a substantial access hole to enable a sufficiently robust tool to be used which could for example be used with a seized high pressure spool.

SUMMARY OF THE INVENTION

According to the present invention, there is provided a selective rotation arrangement for a shaft, the arrangement including a housing mountable spaced from the shaft and an engagement member with distal and proximal ends which is selectively movable relative to the housing towards or away from the shaft between an operating position towards the shaft and a rest position clear of the shaft, the engagement member having a gear member at the distal end thereof which is engageable with the shaft in the operating position to permit turning of the shaft by the engagement member, but is disengaged from the shaft in the rest position.

A resilient urging arrangement may be provided engageable between the housing and the engagement member to urge the engagement member into the rest position.

The resilient urging arrangement may include a spring engageable between the engagement member and the housing.

A tool engagement formation may be provided on the proximal end of the engagement member to enable a tool to engage therewith to cause rotation of the engagement member.

The housing may include a passage along a part of which the engagement member is slidably movable between the operating and rest positions. The passage may extend substantially radially in use relative to the shaft. The selective rotation arrangement may be configured such that in use the passage extends at least partially downwardly from the shaft.

One or more seals may be provided between the engagement member and the housing.

The invention also provides a selective rotation arrangement for a shaft on a gas turbine engine, the arrangement being according to any of the preceding six paragraphs, with the engagement member being selectively engageable with a gear on or connected to the or one of the drive shafts of the engine.

The selective rotation arrangement may be arranged such that the engagement member is selectively engageable with a gear on the high pressure compressor rotor shaft.

The invention further provides a gas turbine engine, the engine including a selective rotation arrangement according to either of the preceding paragraphs.

Alternatively, the preceding claims wherein the arrangement comprises an indexing device to provide a fixed position or rotation of the shaft.

Preferably, the indexing device comprises any one or more of the group comprising a ratchet, a sprag clutch and a brake.

Preferably, the arrangement comprises a main axis, the main axis arranged radially to a rotational axis of the shaft, but may be within 45 degrees of a radial line to a rotational axis of the shaft.

The engine may be arranged such that external power is taken from the intermediate pressure compressor rotor shaft.

The selective rotation arrangement may be mounted on an external casing of the engine.

A mounting arrangement may be provided on the casing of the engine to enable a tool to be selectively mounted thereon. The mounting arrangement may be configured such that when a tool is mounted thereon the tool engages with the engagement member to urge the engagement member to the operating position, and such that rotation of the tool causes rotation of the engagement member and hence of the engine drive shaft.

DETAILED DESCRIPTION OF THE PREFERRED EMBODIMENTS

Figure 1:
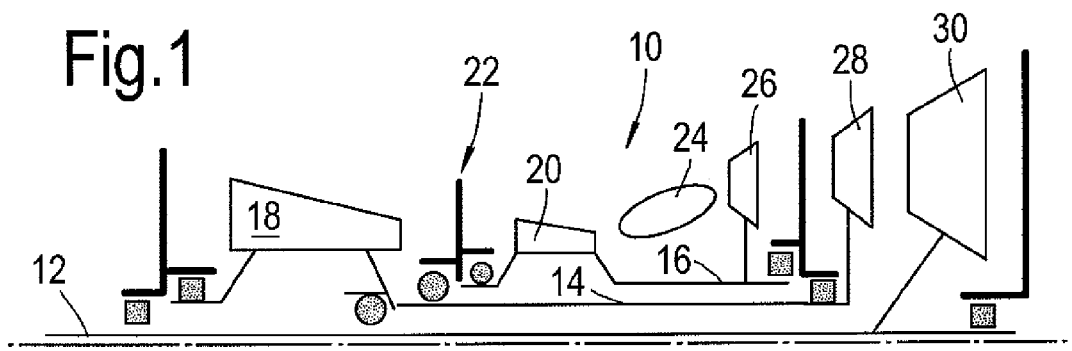
FIG. 1 is a diagrammatic sectional view through a typical multishaft gas turbine engine which is not according to the invention.
Figure 2:
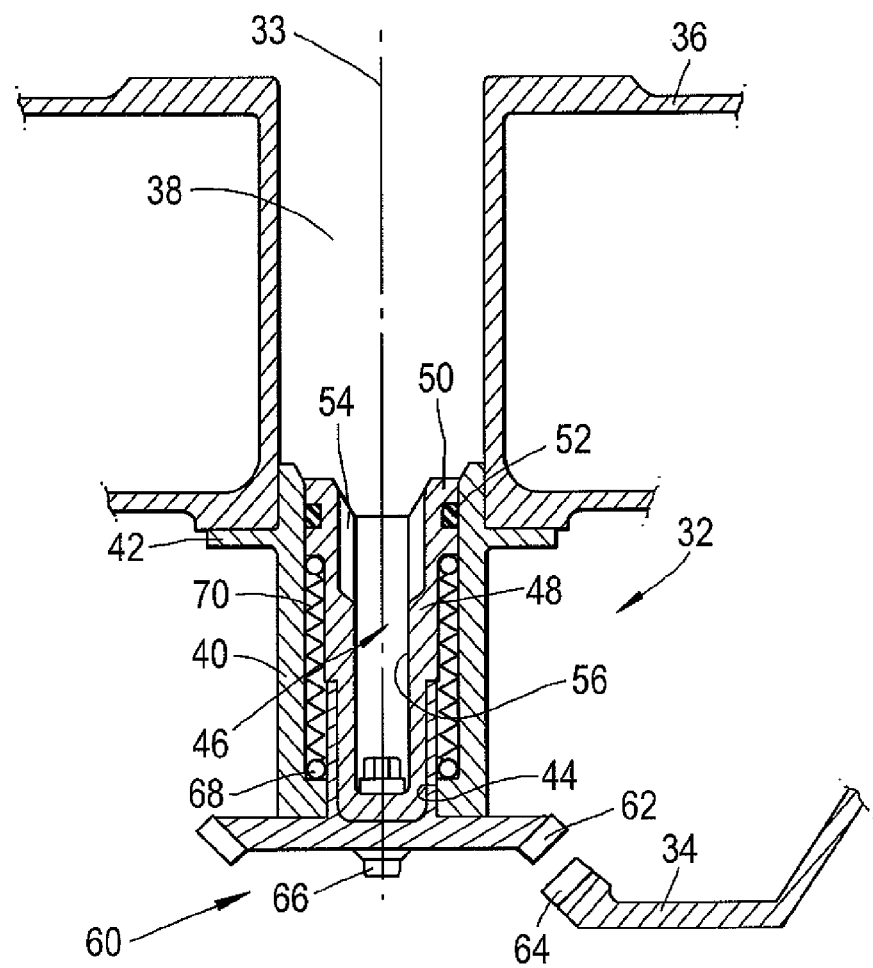
FIG. 2 is a diagrammatic cross-sectional view through a selective rotation arrangement according to the invention in a rest condition.
Figure 3:
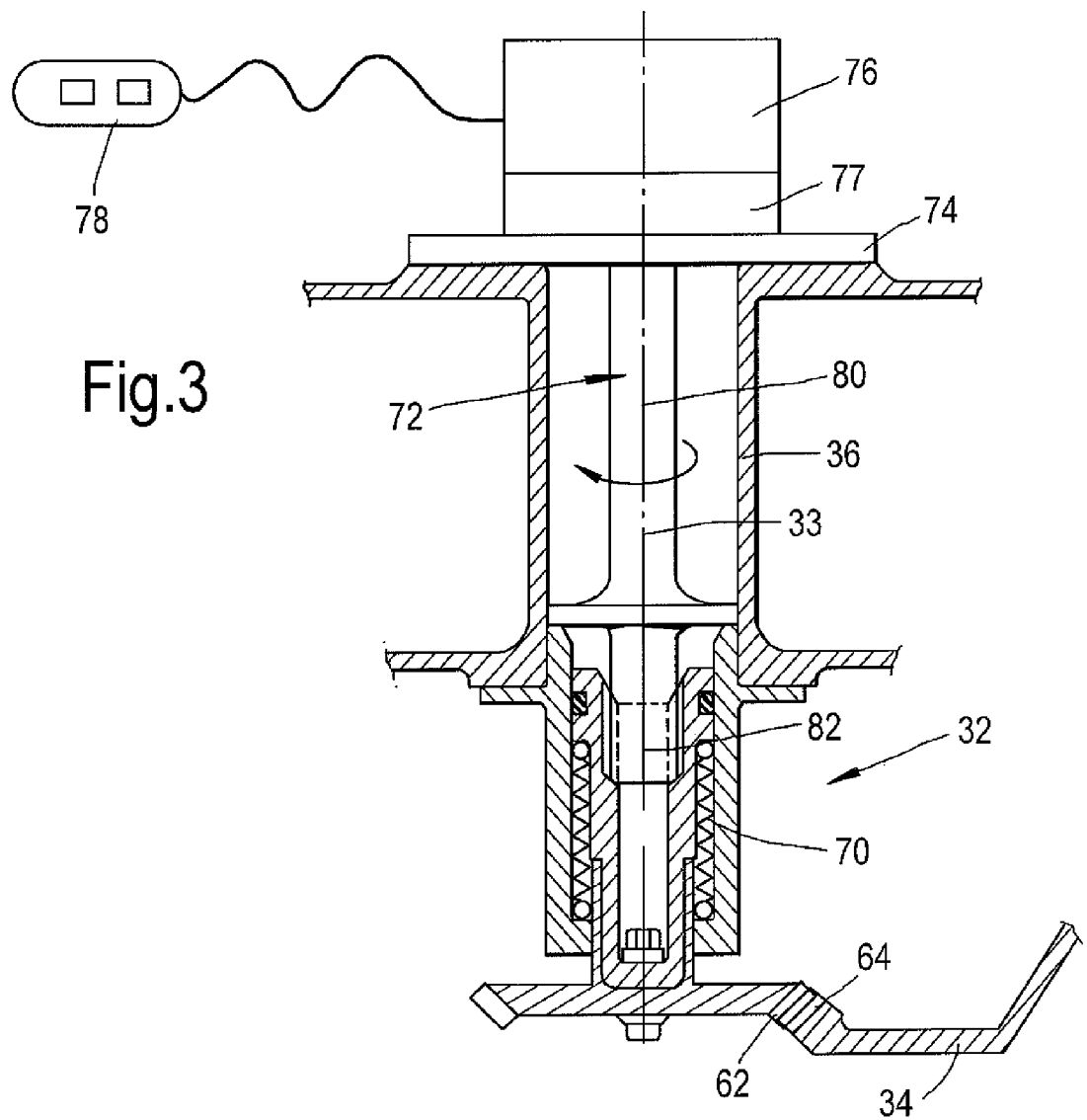
FIG. 3 is a similar view to FIG. 2 but with the arrangement in use and in an operating condition.
Figure 4:
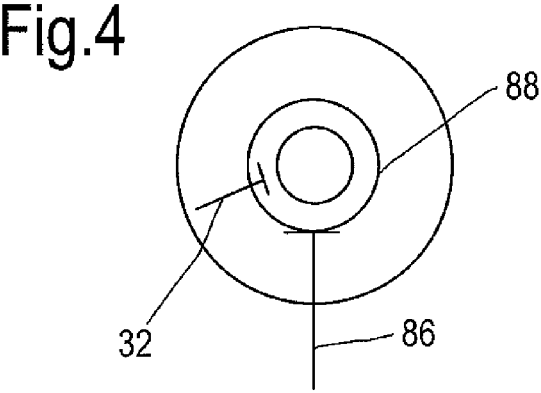
FIG. 4 is a diagrammatic axial view of part of a gas turbine engine incorporating the arrangement of FIG. 2.

FIGS. 2 to 4 show a selective rotation arrangement 32 selectively engageable with a high pressure compressor rotor shaft 34 of an aircraft gas turbine engine. The arrangement 32 is mounted to the external casing 36 of the engine, and an opening 38 is provided through the casing 36. The arrangement 32 includes a sleeve 40 which is concentrically mounted on the inside of the casing 36 relative to the opening 38. The sleeve 40 is mounted by a mounting flange 42, engaging around the opening 38 on the inner side of the casing 36. The sleeve 40 has a radially inwards smaller opening 44.

An engagement member 46 is slideably moveable along the sleeve 40. The engagement member 46 includes a sleeve part 48 which has an enlarged proximal head 50 which is slideably moveable in the sleeve 40. A seal 52 is provided around the head 50. A tool engagement formation 54 is provided inside the head 50. The formation 54 may be in the form of a spline or square lobe, or other appropriate formation.

A distal part 56 of the sleeve part 48 is of reduced diameter, and this receives a sleeve mounting portion 58, so as to provide a substantially continuous outer surface, of a gear member 60. The gear member 60 includes a bevel gear 62 which is engageable with a corresponding bevel gear 64 on the high pressure rotor shaft 34. The gear member 60 is mounted to the sleeve part 48 by a fastening 66 engaging through the distal end of the sleeve part 48.

A further seal 68 in the form of an O ring or otherwise is provided around the inside of the sleeve opening 44, and is engageable against the sleeve mounting portion 58 of the gear member 60. A compression spring 70 is located between the radially inner side of the proximal head 50, and the surroundings of the opening 44. The compression spring 70 urges the engagement member 46 radially outwards such that in a rest position as shown in FIG. 2, the gears 62 and 64 are spaced from each other and disengaged.

FIG. 3 shows the arrangement 32 in use. Here a tool assembly 72 is mounted by a service pad 74 on the casing 36 concentrically with the opening 38. A tool motor 76 is provided on the service pad 74 connected to a controller 78 for operation of the assembly 72. The motor 76 is connected to a tool member 80 which has on its distal end 82 an appropriate formation to engage with the tool engagement formation 54. A flange 84 is provided around the tool member spaced a little from the distal end 82, and in an in use condition as shown in FIG. 3, the flange 84 engages substantially against the proximal end of the sleeve 40.

The arrangement 32 can be used for instance for inspection of the high pressure rotor when the engine is out of use. The tool assembly 72 can be selectively fitted as shown in FIG. 3, on the casing 36. The tool member 80 engages against the sleeve part 48 urging the sleeve part 48 against the compression spring 70 such that the bevel gear 62 is urged into engagement with the bevel gear 64. The controller 78 can then be used as required to rotate the tool assembly 72, and hence the high pressure rotor shaft 34 and rotor to enable the blades thereof to be inspected.

Once an inspection procedure has been completed the tool assembly 72 can be removed by dismounting the service pad 74. Removal of the tool member 80 from the sleeve part 48 should cause the sleeve part 48 to move radially outwards under the force of the spring 70 and hence cause the gears 62, 64 to disengage from each other.

The direction of the helix on the high pressure bevel gear 64 can be arranged to 'throw' the gear member 60 out of engagement when the engine is started, if disengagement has not occurred due to the force of the spring 70.

The tool assembly 72 or another tool arrangement can be used to simply hold the high pressure rotor shaft 34 against rotation, for example to enable minor damage on the rotor blades to be repaired or dressed out.

FIG. 4 is a diagrammatic axial view which shows the external drive 86 coming from the intermediate pressure drive shaft 88, with the external drive extending substantially downwardly. The arrangement 32 is angularly spaced from the external drive 86 upwardly, but is arranged such that the opening 38 still points downwardly to prevent debris and dirt locating in the opening 38 during use.

There is thus described an arrangement which permits selective rotation of the high pressure rotor shaft, whilst enabling drive to be taken from the intermediate pressure shaft. The arrangement does not affect normal working of the engine, and is only operable when a tool is inserted into the opening in the casing, and urged against the arrangement. The assembly therefore readily permits inspection and servicing of the high pressure rotor without affecting normal use of the engine in anyway.

The arrangement 32 has a main axis 33 about which its rotatable parts turn. As shown, and preferably, the arrangement is configured so that the main axis 33 is perpendicular or radially aligned to the engine axis 12. Nonetheless, the main axis may be leant forwardly or rearwardly along the engine axis by up to 45 degrees.

Figure 5:
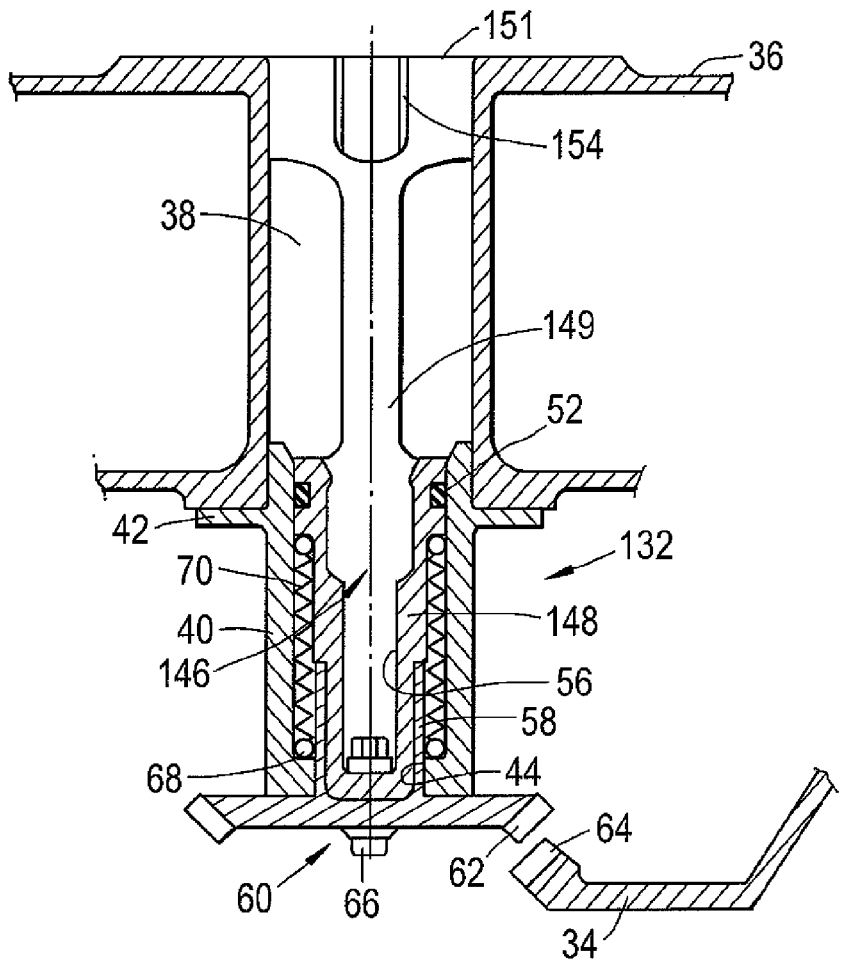
FIG. 5 is a similar view to FIG. 2 but of a modified arrangement according to the invention.

FIG. 5 shows an alternative arrangement 132. The arrangement 132 is similar to the arrangement 32 in most respects, and only the differences are thus noted. In the arrangement 132 the engagement member 146 has an extension part 149 of a length such that the proximal end 151 thereof is substantially flush with the casing 36, and again provides a tool engagement formation 154. In this instance the engagement formation 154 is therefore approximately flush with the outer surface of the casing 36.

Figure 6:
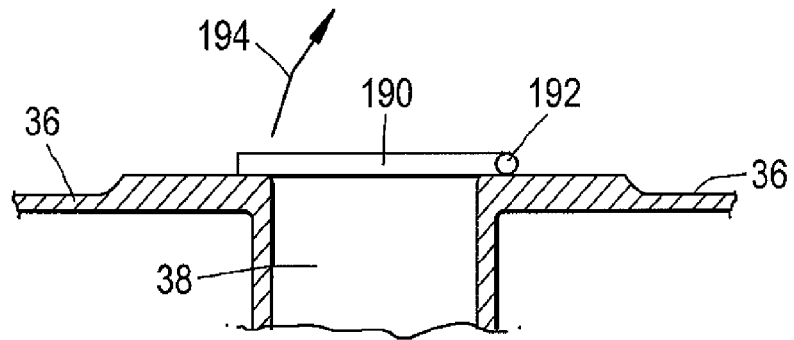
FIG. 6 is a cross sectional view through part of a further modified arrangement according to the invention.

As an alternative to the opening 38 pointing downwardly, or in addition to this safeguard, a selectively openable flap 190 may be provided, as is illustrated in FIG. 6. Here the flap 190 is attached to the casing 36 by a sprung hinge 192, such that in a rest position the flap 190 will automatically move to close the opening 38. When access to the opening 38 is required, the flap 190 can be pivoted outwardly in the direction shown by the arrow 194 against the force exerted by the sprung hinge 192.

The present invention is particularly suitable for rotating a rotor stage of a gas turbine engine so that each blade is presented to inspection equipment and/or repair/maintenance equipment which is in a fixed position. Alternatively, the rotor stage again can be rotated so that inspection or maintenance equipment can be rotated to each of an annular array of stators or an annular component that is static. Although the motor 76 may be accurately controlled to rotate the rotor or shaft 34 a particular amount, a further indexing device 77 can be incorporated into the arrangement 32 to provide a positive and fixed positioning of the rotor or shaft. A fixed position of the rotor allows more substantial maintenance operations on the rotor components. Furthermore, the indexing device 77 is capable of allowing predetermined degrees of rotation so that each blade or part of a blade of the rotor may be brought into view or reach of the inspection or maintenance equipment.

The indexing device 77 is a simple ratchet as is well known in the art, but can be a sprag clutch can be substituted. These devices allow rotation in one direction whilst preventing rotation in the other and against any maintenance operation force that might be applied. To positively locate the rotor the motor is operated to index the rotor in the next ratchet position and is then reversed to accurately lock the rotor against the ratchets anti-rotation features. Alternative to the ratchet or sprag clutch, the indexing device 77 may be a simple brake mechanism with a single brake pad or a calliper mechanism.

Still further the indexing device 77 may be a plate with an array of holes into which a biased pin may be inserted. The pin may be retracted or inserted into the hole by an electronically operated solenoid device.

It should be noted that the gearing 62, 64 permits multiple rotations of the arrangement 32 for each revolution of the rotor or shaft 34 which results in good positional accuracy.

Various other modifications may be made without departing from the scope of the invention. For instance the assembly may be usable with different tools or types of tools. A different biasing arrangement could be used. Whilst the invention has been described for a particular application in an aircraft gas turbine engine, the invention can be used in other locations in this type or other types of gas turbine engines. Furthermore, it is to be realised that the invention can be used for selective rotation of shafts in a wide range of different applications.

What is claimed is:

1. A rotation apparatus for a shaft, the apparatus including a housing mountable spaced from the shaft and an engagement member with distal and proximal ends which is selectively movable relative to the housing towards or away from the shaft between an operating position towards the shaft and a rest position clear of the shaft, the engagement member having a gear member at the distal end thereof which is engageable with the shaft in the operating position to permit turning of the shaft by the engagement member, but is disengaged from the shaft in the rest position, wherein the apparatus further comprises a main axis, the main axis arranged within 45 degrees of a radial line to a rotational axis of the shaft.

2. An apparatus according to claim 1, further comprising a resilient urging apparatus engageable between the housing and the engagement member to urge the engagement member into the rest position.

3. An apparatus according to claim 2, wherein the resilient urging apparatus further comprises a spring engageable between the engagement member and the housing.

4. An apparatus according to claim 1, further comprising a tool engagement formation on the proximal end of the engagement member to enable a tool to engage therewith to cause rotation of the engagement member.

5. An apparatus according to claim 1, wherein the housing includes a passage along a part of which the engagement member is slidably movable between the operating and rest positions.

6. An apparatus according to claim 5, wherein the passage extends substantially radially in use relative to the shaft.

7. An apparatus according to claim 5, wherein the selective rotation arrangement is configured such that in use the passage extends at least partially downwardly from the shaft.

8. An apparatus according to claim 1, further comprising one or more seals between the engagement member and the housing.

9. A rotation apparatus for a shaft on a gas turbine engine according to claim 1 with the engagement member being selectively engageable with a gear on or connected to the shaft.

10. A rotation apparatus according to claim 1 further comprises an indexing device to provide a fixed position or rotation of the shaft.

11. A rotation apparatus according to claim 10 wherein the indexing device further comprises any one or more of the group comprising a ratchet, a sprag clutch and a brake.

12. A rotation apparatus according to claim 1 wherein the main axis is radially aligned to the rotational axis of the shaft.

13. An engine according to claim 9, wherein the selective rotation arrangement is mounted on an external casing of the engine.

14. An engine according to claim 13, further comprising a mounting apparatus is provided on the casing of the engine to enable a tool to be selectively mounted thereon.

15. An engine according to claim 14, wherein the mounting arrangement is configured such that when a tool is mounted thereon the tool engages with the engagement member to urge the engagement member to the operating position, and such that rotation of the tool causes rotation of the engagement member and hence the engine drive shaft.

* * * * *